United States Patent [19]
Stent

[11] 3,905,853
[45] Sept. 16, 1975

[54] REINFORCED PLASTICS TUBES

[75] Inventor: Vernon Denis Stent, Guildford, England

[73] Assignee: Creators Limited, England

[22] Filed: Mar. 11, 1974

[21] Appl. No.: 450,157

Related U.S. Application Data

[63] Continuation-in-part of Ser. No. 143,945, May 17, 1971, abandoned.

[30] Foreign Application Priority Data
May 21, 1970 United Kingdom............... 24761/70
Dec. 11, 1970 United Kingdom............... 59201/70
Mar. 4, 1971 United Kingdom................. 6052/71

[52] U.S. Cl. ................ 156/187; 156/244; 156/431; 156/500; 264/173; 425/113
[51] Int. Cl.² ..................... B65H 59/16; B32B 31/30
[58] Field of Search ............ 264/173, 174; 156/149, 156/244, 166, 192, 432, 143, 443, 431, 187, 188, 172; 425/110, 113

[56] References Cited
UNITED STATES PATENTS

| | | | |
|---|---|---|---|
| 2,284,866 | 6/1942 | Hansson............................. | 156/432 |
| 2,767,431 | 10/1956 | Lauharede.......................... | 425/114 |
| 2,810,424 | 10/1957 | Swartswelter et al................ | 264/173 |
| 2,990,577 | 7/1961 | De Lauharede..................... | 425/114 |
| 3,106,748 | 10/1963 | Skobel............................... | 425/113 |
| 3,159,877 | 12/1964 | Orsini ................................ | 425/113 |
| 3,183,135 | 5/1965 | Berquist............................ | 156/126 |
| 3,191,230 | 6/1965 | Ashton............................... | 425/113 |
| 3,418,404 | 12/1968 | Hird................................... | 264/173 |
| 3,508,297 | 4/1970 | Portelli ............................. | 425/113 |

FOREIGN PATENTS OR APPLICATIONS

| | | | |
|---|---|---|---|
| 45-6953 | 3/1970 | Japan................................. | 425/113 |
| 1,015,954 | 1/1966 | United Kingdom................. | 425/113 |

*Primary Examiner*—Jeffery R. Thurlow
*Attorney, Agent, or Firm*—Larson, Taylor and Hinds

[57] ABSTRACT

A reinforced tube comprising a seamless extruded wall of plastics or elastomeric material having a woven tubular mesh embedded therein is produced by hauling a woven tubular mesh along a mandrel disposed in a passage through an extrusion cross head and through a tubular extrusion nozzle defined by an outer die at the front end of said passage and a die pin at the front end of the mandrel, and simultaneously extruding plastics material through said nozzle. The rear end portion of the mandrel projects beyond the rear of the extrusion head and is supported by support rollers engaging in grooves in said rear end portion, thereby restraining the mandrel against axial movement while permitting the woven tubular mesh to be continuously advanced over the mandrel, being pressed by the rollers against said grooves, and through the passage and the nozzle.

12 Claims, 11 Drawing Figures

REINFORCED PLASTICS TUBES

CROSS-REFERENCE TO RELATED APPLICATION

This application is a continuation-in-part of copending application Ser. No. 143,945 filed May 17, 1971 and entitled "Reinforced Plastics Tubes, now abandoned."

BACKGROUND OF THE INVENTION

The invention relates to the manufacture of reinforced tubes comprising a seamless extruded wall of plastics or elastomeric material having a woven tubular mesh material embedded therein.

Various apparatus for the manufacture of such tubes are described in U.S. Pat. No. 2,990,577 and British Patents Nos. 977208, 992720, 1,015,954 and 1,076,102.

As is disclosed in those patents, the tubular mesh material has to be advanced through a tubular extrusion nozzle which requires that the central die pin of the nozzle be supported against axial movement at a position upstream of the nozzle. The supporting arrangements disclosed in the prior art are expensive and complex and are not able to apply a controlled tension around the periphery of the woven tubular mesh as it is advanced through the extrusion head which is important for uniformly locating the tubular mesh within the thickness of the extruded tube wall. Constructions such as disclosed in the U.S. Pat. No. 2,990,577 require intermittent and alternate release of pairs of mandrel supporting grippers to enable the tubular mesh to be bunched up ahead of the extrusion nozzle, such bunching up preventing the application of a controlled tension on the mesh as it is advanced to the extrusion nozzle. Other constructions, such as disclosed in British Pat. Nos. 977208, 992720, & 1015954 permit continuous feeding of the tubular mesh to the extrusion head, but the constructions are complex and expensive and involve driven feed rolls leading to nonuniformity of tension in the advancing tubular mesh. Moreover in all cases the setting up of the machine for use by threading of the tubular mesh over the central die pin and its supporting means and through the extrusion head is difficult and time consuming.

SUMMARY OF THE INVENTION

An object of the invention is to provide an improved apparatus for manufacturing such tubes which is of simple construction and easier to set-up than prior apparatus.

Another object is to provide a method and apparatus which enables the location of the woven tubular mesh within the thickness of the seamless tubular plastics wall to be uniformly maintained. Basically, these objects are achieved by providing the central die pin at the front end of a straight mandrel which is insertable into a straight passage extending completely through the extrusion crosshead from its front or extrusion nozzle end, leaving a clearance between the mandrel and the passage sufficient to allow the woven tubular mesh to be fed therethrough. The mandrel, although relatively short, is longer than the passage in the extrusion head so that its rear end portion projects beyond the rear of the head when the die pin at its front end is located opposite the external die member at the front end of the passage. The projecting rear end portion of the mandrel is formed with transverse grooves, open at their ends, with which support rollers are engaged to support the mandrel both against axial movement and aligned with the axis of the passage in the head.

In use the tubular mesh, previously threaded on to the mandrel, is forced by the support rollers into the groove means, the clearances between the rollers and the groove means permitting the tubular mesh to be continuously advanced along the mandrel and through the extrusion nozzle, by the device which hauls off the extruded plastics tube with the mesh embedded therein, under controlled tension due to the restraint applied by the mesh being pinched between the rollers and the groove means.

The setting-up of the machine for operation or changing over to a new stock reel of woven tubular mesh is a simple matter. The support rollers are disengaged from the groove means and the mandrel withdrawn through the front of the extrusion crosshead. The free end of the tubular mesh is threaded through the passage in the head, from the rear to the front, the rear end of the mandrel is threaded into the open end of the mesh projecting from the front of the head and the mandrel is then re-inserted in the passage and the groove means re-engaged by the support rollers. The end of the mesh projecting from the front of the head is connected to the haul-off device and extrusion can commence.

The above and other objects and advantages of the invention will be apparent from the following description and the accompanying drawings.

DESCRIPTION OF THE PREFERRED EMBODIMENTS

Referring to FIGS. 1 to 6 of the drawings, the apparatus comprises an extrusion crosshead 2 having a straight passage 2a extending therethrough from its rear end to its front end, where it is provided with the external extrusion die 1. Plastics material is fed to the head 2 from an extruder (not shown) through a tangential inlet 6 to an annular chamber 5 which connects with an inlet opening 7a around and at an intermediate position between the ends of the passage 2a via a conical inlet passage 7. The head 2 comprises a hollow body 8 and an annular member 9 mounted therein forming the chamber 5 and passage 7 therebetween. The member 9 is supported rearwardly of the chamber 5 so that the flow of plastics material through the chamber and the passage 5 is uninterrupted. As shown, the member 9 is supported centrally in the body 8 by being a close fit in the body 8 rearwardly of the chamber 5, and has an externally threaded end 9a on which is screwed a lock nut 10 to secure the member 9 in position. The bore through the member 9 form part of the passage 2a. A straight mandrel-die pin 5 extends through said passage 2a and comprises a rear portion projecting beyond the rear end of said passage 2a, an intermediate portion extending from the rear end of said passage to adjacent said inlet opening 7a and providing an annular space between it and the opposing surface of the passage 2a, a reduced diameter neck portion 16 opposite said inlet opening 7a, and an internal die member or die pin 17 at its front end opposite the external die 1 and defining therewith a tubular extrusion nozzle 4. Between said neck portion 16 and the die pin is arranged a cylindrical guide shroud 14. The external diameter of the shroud 14 is greater than that of the die pin 17 and less than the opposing surface of the passage 2a. The internal cavity 15 of the shroud 14 has a diameter greater than that of the die pin 17 and provides an annular passageway which connects, via a plurality of openings 19 in a wall portion 18 at the rear end of the cavity 15 by which the shroud is carried from the mandrel (see FIGS. 2 and 3), with the annular space 23 around the reduced diameter neck portion 16.

Figures 2, 3:
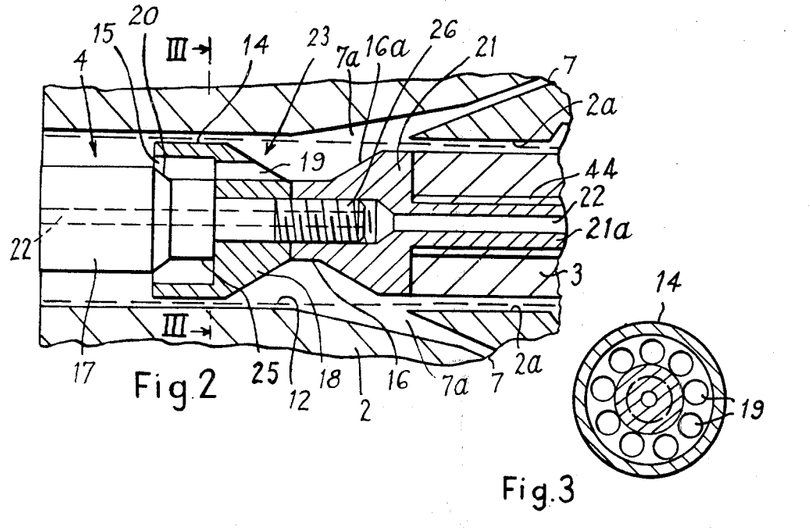
FIG. 2 is an enlarged scrap view of the outlet end of the extrusion head.
FIG. 3 is a scrap section on the line III—III of FIG. 2.

As more clearly shown in FIG. 3, the neck portion 16 is formed in a part 21 having a maximum diameter the same as that of the intermediate portion of the mandrel to which it is connected by a spigot 21a secured into the first end 22 of a bore 44 in said intermediate portion. A rearwardly diverging frusto-conical surface extends between the reduced diameter neck portion 16 and the maximum diameter portion of the part 21. The shroud 14 is also a separate member which is secured to the part 21 by the die pin 17. To this end and the die pin 17 is formed at its rear end with a reduced diameter portion 25 from which projects a threaded spigot 26 on which the shroud member fits and which screws into a threaded socket in the front end of the part 21. A forwardly divering frusto-conical surface 20 connects the die pin 17 with its reduced diameter portion 25.

Figure 1:
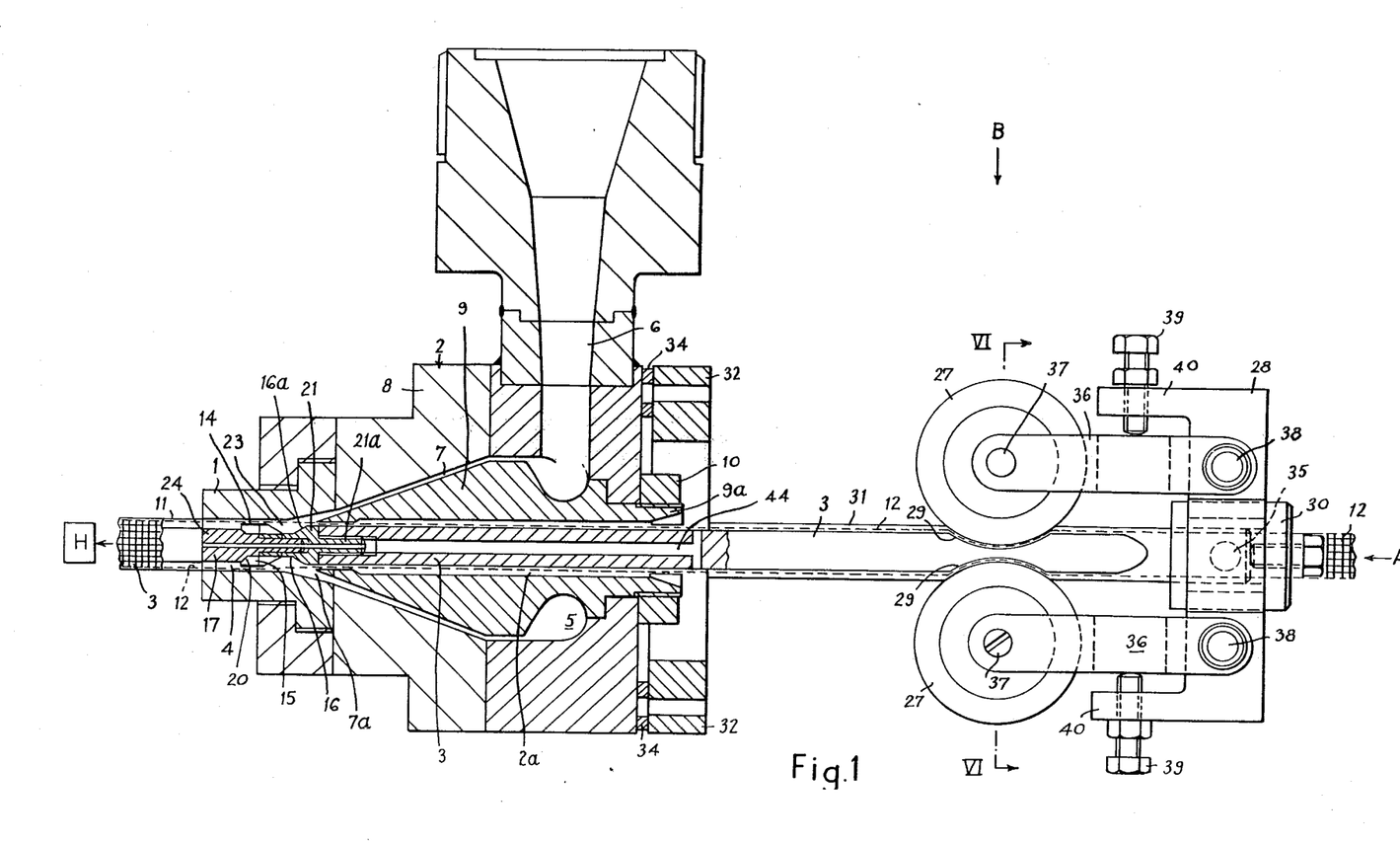
FIG. 1 is a section through one embodiment of apparatus according to the invention.
Figures 7, 8, 9, 10:
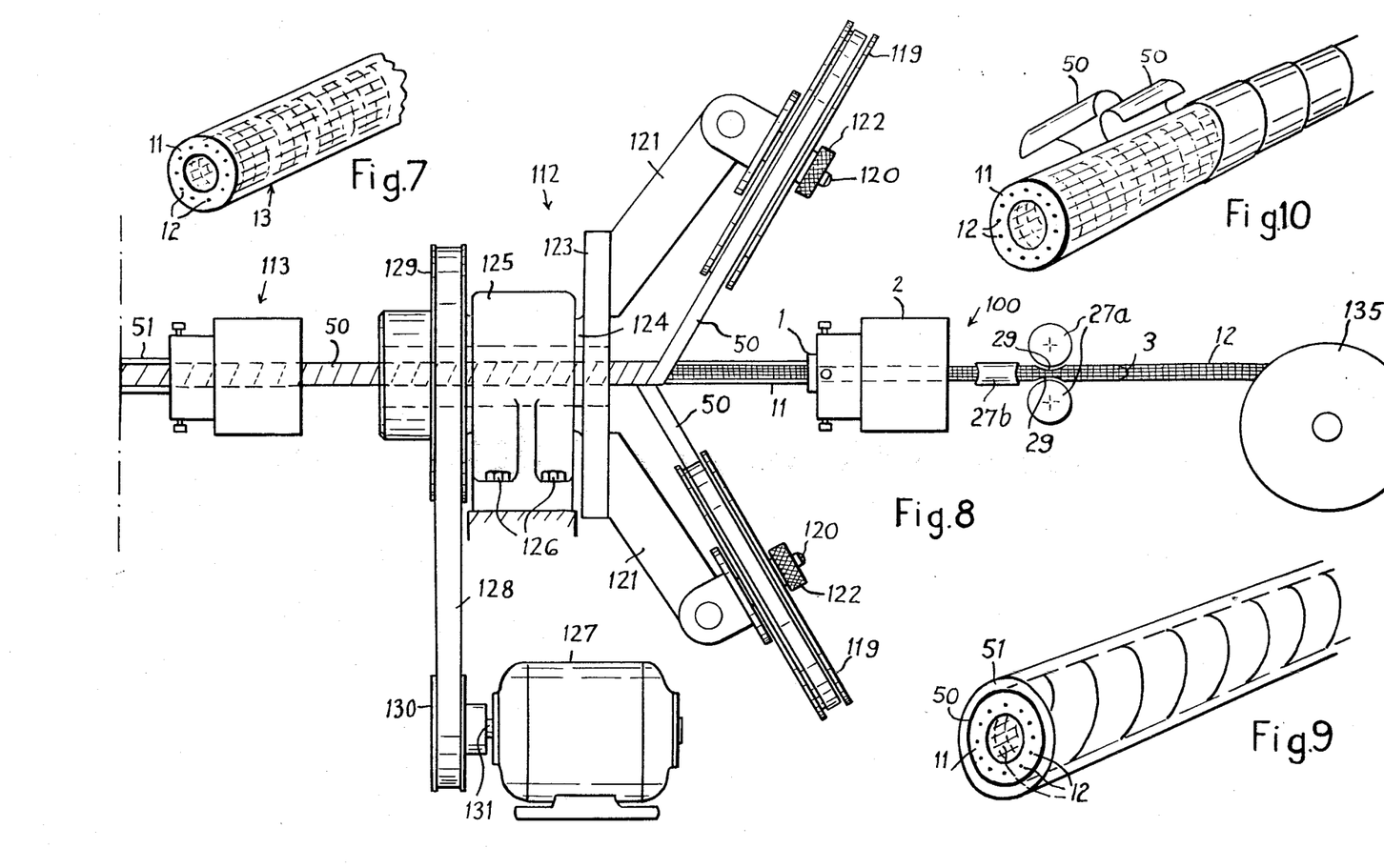
FIG. 7 is a scrap perspective view of a tube made by the apparatus of FIG. 1.
FIG. 8 is a side elevation of another embodiment of apparatus according to the invention, and also illustrating a modification of the apparatus shown in FIG. 1.
FIG. 9 is a scrap perspective view of another tube made with the apparatus shown in FIG. 8.
FIG. 10 is a scrap view showing one stage in the production of the tube shown in FIG. 9.

The rear end portion of the mandrel 3 is supported outside the head 2 by a pair of idler rollers 27, which are suitably of rubber or plastic material. The rollers 27 are mounted one above the other on a yoke 28 carried from the extrusion head 2 and engage in diametrically opposed grooves 29 in the mandrel with clearances between the rollers and the mandrel sufficient to allow a woven tubular mesh 12 to be advanced over the mandrel past the rollers. The yoke is pivotally mounted between head blocks 30 on the ends of two support pillars 31 extending rearwardly from a carrier ring 32 secured to the back of the head 2 by screws 33. Spacer pieces 34 are provided between the ring 32 and the head 2 to limit heat transfer therebetween. The mounting for the yoke comprises a pair of inwardly projecting pins 35 on the blocks 30 which engage in sockets in opposite sides of the yoke, there being clearances between the blocks 30 and the yoke 28 to allow sideways movement of the latter. The yoke is thus freely pivotable about a horizontal axis transverse to the axis of the mandrel and also slidable along said horizontal axis to permit self-adjustment of the rear end of the mandrel in alignment with the passage 2a in the head 2.

The rollers 27 are mounted for movement towards and away from one another on arms 36 which are pivotally connected to the yoke 28, means being provided for adjusting the position of each roller in a direction transverse to the axis of the mandrel. As shown, each arm 36 is bifurcated at both ends and the associated roller 27 is mounted within one end thereof on an axle pin 37. The other end of each arm embraces the yoke and is connected thereto by a pivot pin 38. Adjustment of the spacing between the rollers, and thus the clearance between the rollers 27 and the grooves 29, is achieved by screws 39 provided in flanges 40 projecting forwardly at the top and bottom respectively of the yoke, these screws engaging against the arms 36. The pins 38 may be withdrawn to allow the arms 36 to be disconnected from the yoke for removal and insertion of the mandrel. To facilitate their withdrawal the pins, which conveniently engage in the yoke with a snap action, are provided with heads 38a. An aperture 41 extends through the rear end of the yoke forming a passageway for the tubular mesh which is supplied from a reel (not shown in FIG. 1 but shown at 135 in FIG. 8).

To operate the apparatus, the rollers 27 are first removed and the mandrel 3 extracted from the head 2 through the outlet end of the nozzle 4. The free end of the tubular mesh 12 is then pushed via the aperture 41 through the passage 2a in the head 2, and the mandrel threaded into its bore and placed back in the head 2. The rollers 27 are now remounted on the yoke and engaged in the locating grooves 29 in the mandrel, adjustment to the required clearance being achieved by the screws 39. Plasticised plastics material, for example polyvinyl chloride, is then fed to the inlet 6 and extruded through the nozzle 4 to form a tubular extrudate 11 which is hauled away from the nozzle by a conventional hauloff arrangement represented at 4. The woven textile tubular reinforcing mesh 12 is drawn over the mandrel 3 and through the nozzle 4 as the plastics material is being extruded to produce a reinforced plastics tube 13 (see also FIG. 7) comprising a seamless extruded wall 11 of plastics material having the mesh 12 embedded therein. As the tubular mesh 12 is drawn through the crosshead against the restraint imposed by the mesh being pinched between the rollers 27 and the grooves 29, a part of the plastics material fed to the annular inlet opening 7a flows through the openings in the tubular mesh into the space 23 around the neck portion 16 and thence through the openings 19 and cavity 15 in the shroud 14 to the nozzle 4, the remainder flowing to the nozzle around the exterior of the shroud 14. These two flows of plastics material recombine beyond the shroud to form the extrudate 11 with the mesh 12 embedded therein. The cross-sectional area of the outlet end of the nozzle 4 is such that the part of the plastics material which passes through the shroud and is divided into separate filament-like streams as it passes through the openings 19, will be sufficiently compressed as it passes through the converging space between the frusto-conical surface 20 and the interior surface of the cavity 15 to form a solid tubular extrudate. The shroud 14 serves to maintain the tubular mesh in the desired position in the tube wall and may be dimensioned so that the tubular mesh is stretched as it passes over the shroud.

Figures 4, 6:
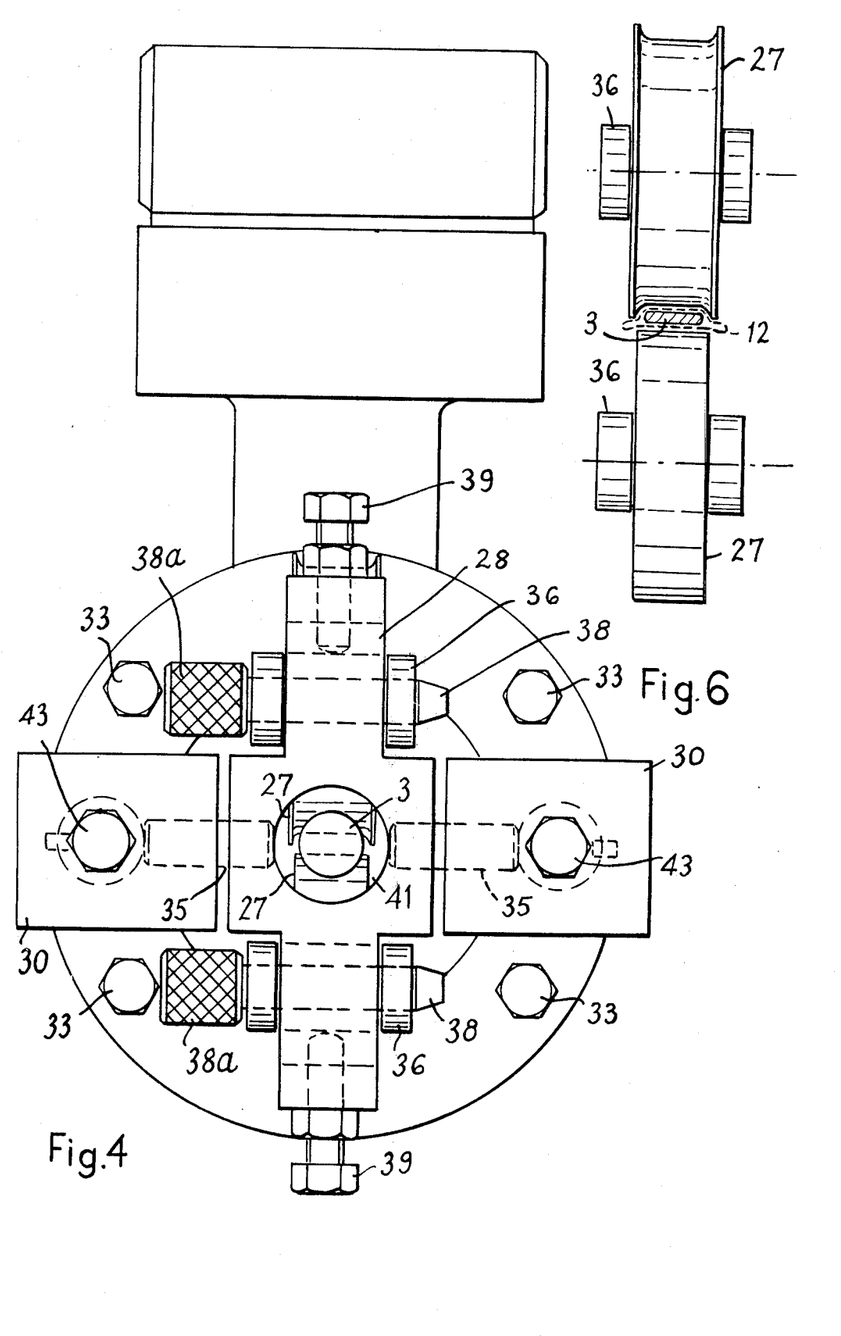
FIG. 4 is a view in the direction of the arrow A shown in FIG. 1.
FIG. 6 is a scrap section along the line VI—VI of FIG. 1.
Figure 5:
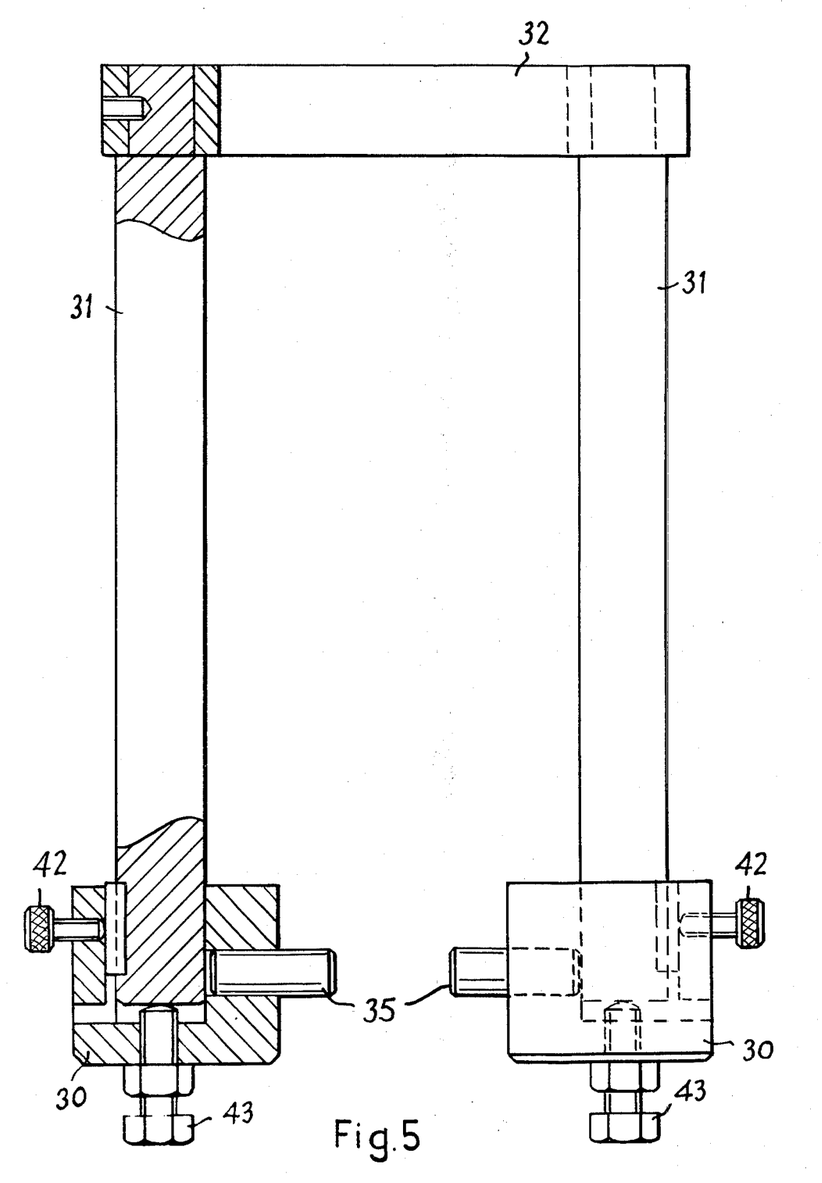
FIG. 5 is a scrap view in the direction of arrow B shown in FIG. 1.

During the extrusion operation the mandrel 3 is restrained against axial movement by the rollers 27 engaging in the grooves 29. As shown in FIGS. 4 and 6, the upper roller 27 has a grooved rim for restraining sideways movement of the mandrel. The front end of the mandrel floats in the plastics material being extruded and is thereby located centrally within the nozzle, the rollers 27 supporting the rear end of the mandrel and, since they are mounted in a self-adjusting manner allowing the mandrel to be centred in the passage 2a, surrounded by the tubular mesh 12.

The bore 44 provides a vent passage extending through the intermediate portion of the mandrel from outside the head 2 which connects with a vent passage 22 through the part 21 and die pin 17 to equalize the air pressures inside and outside the tube 13 and prevent collapse of the tube.

The tube may be cooled upon leaving the die by passing it through a water bath and is pulled from the die by suitable haul-off means, e.g. a caterpillar haul-off device, which should be aligned with the axis of the die pin to avoid pulling the die pin 17 off centre. If desired, the extruded tube may also be passed through a sizing device.

Instead of the rear end of the mandrel 3 being supported by a single pair of rollers 27 as described above, it may be supported by two or more pairs of rollers 27. Such a modification of the apparatus described above is shown in FIG. 8, being indicated by the reference 100, in which the rear end of the mandrel 3 is supported by two pairs of idler rollers 27a and 27b arranged mutually at right angles at spaced positions along the mandrel. The rollers 27 are mounted on a frame (not shown) carried by the extrusion head 2 and the rollers of each pair engage in diametrically opposed grooves 29 in the mandrel with a clearance between the rollers and the grooves sufficient to allow the mesh 12 to be advanced over the mandrel past the rollers. During extrusion, the mandrel is restrained against axial movement by the rollers 27 engaging in the grooves 29. The rollers of each pair may be mounted in self-adjusting yokes in the manner described above or they may be adjustable to fixed positions, in which case, in order to centralize the mandrel 3 in the passage 2a in the head 2, the rollers of each pair are adjustable at right angles to the mandrel in their common plane and in the plane normal thereto. In the latter case, the rollers of each pair can also be moved apart to allow the mandrel 3 to be removed from the head 2, and to ensure that the rollers return to their initial positions after they have been moved apart, they can be moved apart and together by a toggle mechanism.

Figure 11:
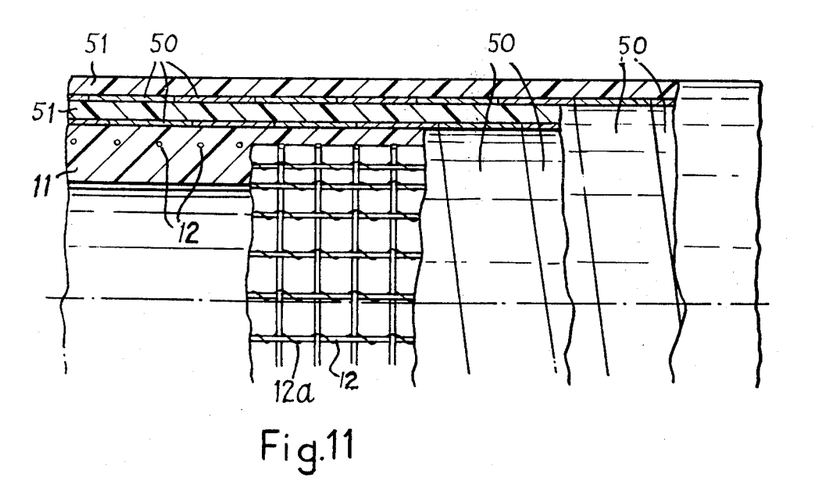
FIG. 11 is a cross-section, partly broken away, through the wall of a further tube made with the apparatus according to the invention.

In order to maintain a uniform controlled tension in the tubular mesh as it is advanced through the extrusion head, it is important that the tubular mesh should be woven with longitudinally extending warps and that the longitudinally spaced wefts should extend circumferentially and substantially at right angles to the warps. It is preferable that the warps and wefts be tied together at their crossing points by a binding thread, as shown at 12a in FIG. 11, in order to prevent displacement of the wefts relative to the warps under the forces experienced as the mesh is advanced through the extrusion head, such as by the flowing of the plastics material through the mesh into the space 23 around the neck portion 16 of the mandrel. Such displacement of the wefts can introduce variations in the diameter of the tubular mesh which can introduce variations in the location of the mesh in the thickness of the extruded tube wall.

The tubular mesh 12 is suitably woven of nylon. It may be woven of other materials e.g. wire or glass or a plastics material, such as MYLAR (Registered Trade Mark). If a mesh woven of wire is used, the metal wires may serve, when earthed, to prevent build-up of electrostatic charges in the tube. Or a separate earthing wire strand or metal strip may be embedded in the tube wall alongside the mesh by passing it through the nozzle 4 with the mesh. Where such a strip is arranged along the exterior of the mesh and the plastics wall material is transparent or translucent, the strip may be printed to display advertising matter or information through said transparent wall.

Further, to maintain as uniform location of the tubular mesh with the wall of the plastics tube, the tension in the tubular mesh should be controlled so as to be substantially uniform around the entire periphery of the tubular mesh. This is achieved by uniformly pinching, between the rollers and the grooves, as many of the longitudinal warps as possible. The arrangement using four supporting rollers as shown in FIG. 8 enables this to be more easily achieved than when using only two support rollers as shown in FIG. 1.

In order to reduce the tendency for the mandrel to move downstream (i.e. towards the extrusion end of the head 2) during the extrusion operation, and so reduce the pinch pressure on the mesh between the rollers 27 and the mandrel grooves, the pressure of the plastics material in the head can be used to exert a back pressure on the mandrel in the upstream direction. This back pressure is determined inter alia by the length of the die pin 17 within the outer die 1 and the diameter of the shroud 14. Adjustment of the back pressure may thus be achieved by axial adjustment of the die pin 17 and to this end the head blocks 30 are adjustably mounted on the pillars 31. As shown, the blocks 30 are fixed in position on the ends of the pillars 31 by lock screws 42 and adjustment may be effected by screws 43. It will be appreciated that adjustment of the head blocks in this manner alters the position of the rollers 27 and thus the axial position of the mandrel and its die pin 17.

In order to provide additional reinforcement, a tube according to the invention may, as shown in FIG. 9, have wrapped around the extrudate 11 with the mesh 12 embedded therein at least one layer of helically wound reinforcing tape 50, with the turns thereof overlapping. Such a tube may be produced by arranging in line with the extrusion apparatus described above, one or more wrapping units for wrapping reinforcing tape about the extrudate 11 from the die 1 and one or more further cross-head extrusion devices for extruding plastics material about the or each layer of reinforcing tape. One embodiment of such apparatus is shown in FIG. 8 in which a wrapping unit 112 and a cross-head extrusion device 113 are arranged in line with the extrusion apparatus 100 described above.

The wrapping unit 112 comprises a plurality of spools 119, preferably arranged in pairs with the spools of each pair diametrically opposite, containing the tape 50 and mounted for rotation about the extrudate 11 for wrapping the reinforcing tape 50 thereabout as it leaves the die 1. Two spools 119 are shown which are disposed at diametrically opposed positions about the extrudate. Each spool is mounted at a trailing angle with respect to the extrudate on a mounting spindle 120 provided at the free end of a support arm 121. The spools 119 are detachably mounted on the mounting spindles 120 for replacement when empty and are retained on their respective mounting pins by nuts 122. The support arms 121 are carried by an annular flange 123 at one end of a tubular member 124 and project outwardly and rearwardly therefrom. The member 124 is rotatably mounted in a bearing block 125 which is fixed to a base, e.g. by bolts 126 at each side. The member 124 is driven in rotation by a motor 127 via a belt drive, the belt 128 passing over pulleys 129, 130 fixed on the member 124 and the motor drive shaft 131 respectively.

As mentioned above the spools 119 are arranged at a trailing angle with respect to the extrudate 11 and to enable this angle to be correctly adjusted according to the speed at which the extrudate is being extruded and the speed of rotation of the member 124, the spindles 120 are angularly adjustable relative to the support arms 121.

The extrusion device 113, which has an extrusion nozzle through which the extrudate, with the tape 50 around it, is fed, is arranged beyond the wrapping unit and beyond this is the coolant bath and haul-off means (not shown).

In operation, the extrusion apparatus 100 is set up and spools 119 carrying the reinforcing tape 50 are loaded into the wrapping unit. Plastics material is extruded through the extrusion nozzle of the apparatus 100, the mesh 12, which is drawn from a reel 135, simultaneously being advanced through the nozzle over the mandrel 3, to form the extrudate 11 with the reinforcing mesh 12 embedded therein. The reinforcing tape 50, which may for example be of textile material, synthetic fibres, paper or metal or plastics strip, is wound or wrapped around the extrudate 11 as it leaves the extrusion die 1 and is still heat-softened, to form a helically-wound layer of the tape around the extrudate with the turns of the tape overlapping. For a given speed of extrusion, the angle of the helically-wound turns of tape 50 and the amount by which they overlap may be adjusted by varying the rotational speed of the member 124. By arranging the spools 19 diametrically opposite, the sideways forces applied to the extrudate as the tape is wound thereabout are counter-balanced.

The wrapped extrudate (as shown in FIG. 10) passes through the tubular member 124 of the wrapping unit and into the extrusion device 113 whether further plastic material, e.g. polyvinylchloride, is extruded about the reinforcing tape 50 to form a coating or sheath 51 of the further plastics material encapsulating the tape and producing the reinforced plastics tube shown in FIG. 9. The coating 51 may be extruded of the same plastics material as the extrudate 11 or a different plastics material.

From the device 113 the tube passes through the coolant bath and is hauled-off by the haul-off device.

If desired a second wrapping unit (not shown) which is roatated in the opposite direction to the unit 112, may be arranged between the latter and the extrusion device 113. The layer of tape 50 produced will thus have two oppositely-wound plies.

Preferably the reinforcing tape 50 is bonded to the extrudate 11 and/or the coating 51. Thus the reinforcing tape may be fibrous or have roughened surface so that the plastics material in contact with it enters the interstices in the surfaces of the tape to effect a bond therebetween. Or the tape may be coated with a heat-sensitive adhesive compatible with the plastics material. The adhesive coating may be heated, for example by hot air jets, as the tape is fed to the extrudate.

Instead, the tape may be of an open mesh nature, in which case the coating 51 is preferably applied whilst the outer surface of the extrudate 11 is heat-softened so as, where the two plastics materials are compatible or the same, to effect a bond therebetween. The coating 51 may be applied whilst the extrudate is still heat-softened from the device 100 or the surface of the extrudate may be heat-softened, for example by hot air jets.

A reinforced tube having a plurality of separate layers of the reinforcing tape 50 embedded therein may be produced by arranging one or more further wrapping units and one or more further extrusion devices between the device 113 and the coolant bath. Thus a further layer of tape 50, comprising one or more plies, can be wound about the coating 51 and a further coating 51 of plastics material extruded therearound to produce the tube shown in FIG. 11. This may be repeated to produce a tube of which the extruded wall has a desired number of tubular layers of reinforcing tape embedded therein. Preferably, each further wrapping is applied whilst the coating of plastics material about which it is wound is heat-softened.

In a modification of the apparatus shown in FIG. 8, an additional cross-head extrusion device may be arranged between the device 100 and the wrapping unit 112, the extrudate from the device 100 suitably being extruded with the tubular mesh 12 partially embedded in the outer surface thereof and then being passed through the additional extrusion device wherein a coating of a second, different plastics material is extruded therearound to produce the reinforced tube which is fed to the wrapping unit. Preferably the two plastics materials are compatible and bonded or adhered to one another.

The pinching of the mesh between the rollers 27 and the grooves 29, to provide a tension in the mesh as explained, also serves in the apparatus described with reference to FIG. 8 to give the extrudate 11, and, where applicable, the subsequent extrusions, stability to receive the reinforcing tape without collapsing.

In a further modification a reinforced plastics tube as shown in FIG. 7 is produced separately and fed directly to the wrapping unit 112 from a reel. Preferably the outer surface of the tubular wall is heat-softened, e.g. by hot air jets, before the reinforcing tape is wound thereabout.

In a further modification according to this invention, the wrapping unit is omitted and the extrudate 11 and the coating or sheath 51 are extruded from different plastics materials, e.g. polyvinylchloride and polyurethane. The The extrudate 11 may be extruded with the mesh 12 completely embedded therein or only partially embedded in the outer surface thereof. There is thus provided a reinforced plastics tube comprising a tubular core of one plastics material having the tubular mesh therein, and around that core a coating of second plastics material.

It will be appreciated that various further modifications may be made without departing from the scope of the invention as defined in the appended claims. For example, whilst polyvinylchloride and polyurethane are specifically referred to above, it will be appreciated that other plastics materials, both thermoplastic and elastomeric, may be used for the wall of the tube. Thus the tube wall may be extruded of an elastomeric material, such as extrudable neoprene rubber or butyl rubber. When producing a tube using an elastomeric material, such as neoprene or butyl rubber for the wall of the tube, the tube is preferably passed through a salt bath at 80°C. as it leaves the extrusion die to cure the wall material.

Whilst a circular nozzle 4 is illustrated, it will be appreciated that the nozzle 4 may have other shapes, e.g. elliptical.

The mandrel 3 may be constructed in other ways than that shown in FIGS. 1 and 2. For example it may be of substantially uniform cross-section and having a swelling or annular lip at the input end of the nozzle 4 for locating the mesh 12 within the nozzle.

What I claim is:

1. Apparatus for manufacturing a reinforced tube comprising an extruded wall selected from plastics and elastomeric materials and having a woven tubular mesh material embedded therein, comprising:
   a. an extrusion crosshead having a front end and a rear end and wall means defining a straight passage extending through said crosshead from its rear end to its front end and having external die means at its front end,
   b. an elongate mandrel which is straight throughout its length, said mandrel being positioned within and spaced from the wall means defining said passage and comprising at one end a die pin co-operating with said external die means to form a tubular extrusion nozzle through which plasticised material fed to said crosshead is extruded, and having its other end projecting beyond said passage at the rear end of the crosshead,
   c. means defining transverse grooves, open at their ends, in the external surface of said projecting portion of the mandrel, and,
   d. means supporting said mandrel in said passage and restraining said mandrel against axial movement comprising support rollers engaging in said transverse grooves and adapted to pinch the woven tubular mesh material between said rollers and said grooves and thereby hold the tubular mesh material in controlled tension while it is being continuously drawn along said mandrel through the passage and the nozzle.

2. Apparatus as claimed in claim 1, wherein said supporting means comprises two pairs of support rollers, the rollers of each pair being arranged at diametrically opposite sides of the mandrel, the pairs of rollers being arranged mutually at right angles and respectively engaging in diametrically opposed transverse grooves at spaced locations along said projecting portion of the mandrel.

3. Apparatus as claimed in claim 1, wherein said support rollers are mounted on a support structure carried from the extrusion crosshead, means being provided for adjusting the position of each roller in a direction transverse to the axis of the mandrel.

4. Apparatus as claimed in claim 3, wherein said rollers are mounted on said support structure by means permitting said rollers to be disengaged from said grooves and re-engaged with said grooves in the previously adjusted position without it being necessary to readjust said adjusting means.

5. Apparatus as claimed in claim 4, wherein a pair of support rollers, are mounted at diametrically opposite sides of the mandrel on a yoke which is pivoted to said support structure for pivotal movement about an axis transverse to the axis of the mandrel and so as also to be slidable in the direction of said pivotal axis.

6. Apparatus as claimed in claim 1, wherein said extrusion crosshead has an inlet for plasticised material to be extruded leading to an inlet opening around and at an intermediate position between the front and rear ends of said passage, and wherein the mandrel comprises a reduced diameter portion opposite said inlet opening and defining an annular space for the reception of said plasticised material, and a cylindrical guide shroud between said reduced diameter portion and said extrusion nozzle defined by said external die means and said die pin, the external diameter of said shroud being greater than the diameter of said die pin and less than the diameter of the opposing wall means of said passage, and said shroud having openings therethrough for flow of plasticised material from said annular space defined by said reduced diameter portion to said extrusion nozzle.

7. Apparatus as claimed in claim 3, wherein the positions of the support rollers are adjustable towards and away from the extrusion head.

8. Apparatus as claimed in claim 1, in combination with a further extrusion crosshead arranged to receive a reinforced tube leaving said extrusion nozzle for extruding a layer of a plasticised material around the outside of said reinforced tube.

9. The method of making a reinforce tube comprising an extruded wall of plastics or elastomeric material having a woven tubular mesh embedded therein, which comprises the steps of:
   a. providing a woven tubular mesh material comprising longitudinally extending warps interwoven with longitudinally spaced circumferentially extending wefts,
   b. threading a free end of said woven tubular mesh through a straight passage extending from the rear end to the front end of an extrusion crosshead so that said free end projects beyond the front end of said passage.
   c. inserting a straight mandrel of smaller diameter than but longer than said passage and having transverse open-ended groove means adjacent its rear end into said projecting free end of said tubular mesh, said rear end of said mandrel first,
   d. positioning the mandrel, surrounded with the tubular mesh, in said passage with the front end of the mandrel defining with the front end of the passage a tubular extrusion nozzle and with its rear end provided with said transverse groove means projecting beyond the rear end of said passage,
   e. forcing the tubular mesh into said transverse open-ended groove means by support rollers whereby to restrain the mandrel against axial movement and to pinch the mesh between the rollers and the groove means while permitting the mesh to be pulled past the rollers and along the mandrel, f. extruding a plasticised material through said nozzle to extrude a tubular extrudate with the tubular mesh embedded therein, and g. hauling off the extrudate against controlled tension in the tubular material produced by the pinching of the mesh between the support rollers and the groove means.

10. The method as claimed in claim 9, and including guiding the mesh by means of a cylindrical shroud, having a diameter larger than that of the front end of the mandrel and at least as large as the internal diameter of the tubular mesh, which is positioned between said front end and the position where the plasticised material is introduced into the passage for extrusion through the nozzle, and flowing said material both through and outside said cylindrical shroud to the nozzle.

11. The method as claimed in claim 9, which consists in including at least one metal strand with the tubular mesh material as it is advanced through the extrusion nozzle.

12. The method claimed in claim 9, including the further steps of winding a reinforcing tape about said extrudate and extruding plastics material about said reinforcing tape as the extrudate leaves said extrusion nozzle and is still heat-softened.

* * * * *